Dec. 26, 1939.   J. E. JOHNSON   2,185,128
PNEUMATIC SPRING SYSTEM
Filed Sept. 21, 1936   4 Sheets-Sheet 1

INVENTOR.
Julian E. Johnson
BY
ATTORNEY.

Dec. 26, 1939.                J. E. JOHNSON                2,185,128
                        PNEUMATIC SPRING SYSTEM
                    Filed Sept. 21, 1936      4 Sheets-Sheet 2
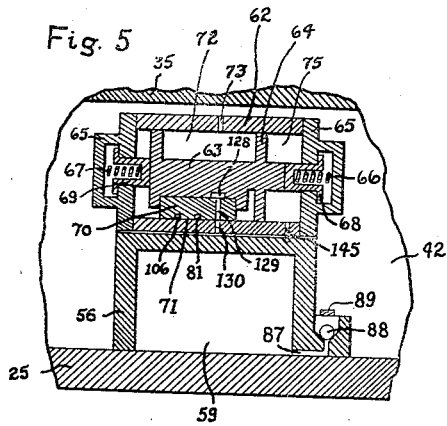
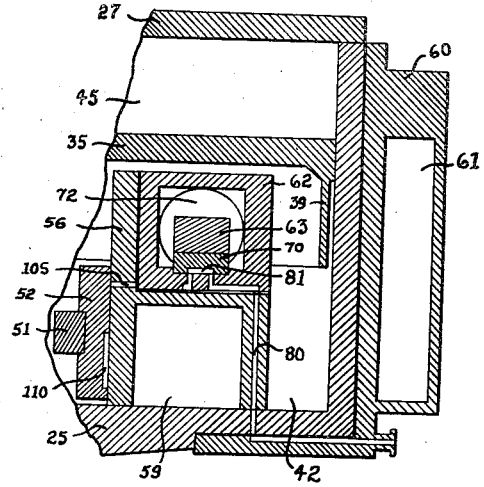
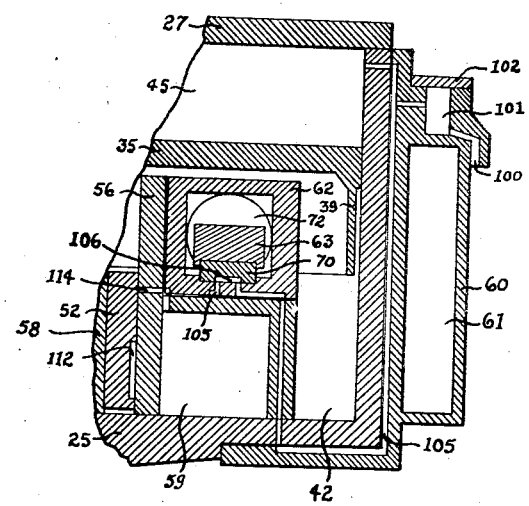
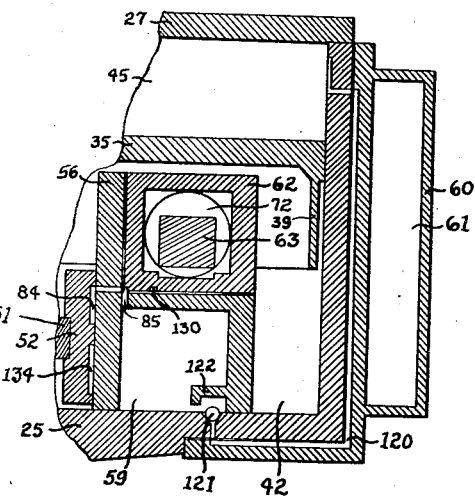
INVENTOR.
Julian E. Johnson
BY
ATTORNEY.

Dec. 26, 1939.  J. E. JOHNSON  2,185,128
PNEUMATIC SPRING SYSTEM
Filed Sept. 21, 1936  4 Sheets-Sheet 3
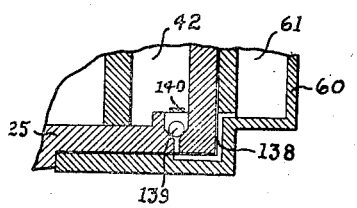
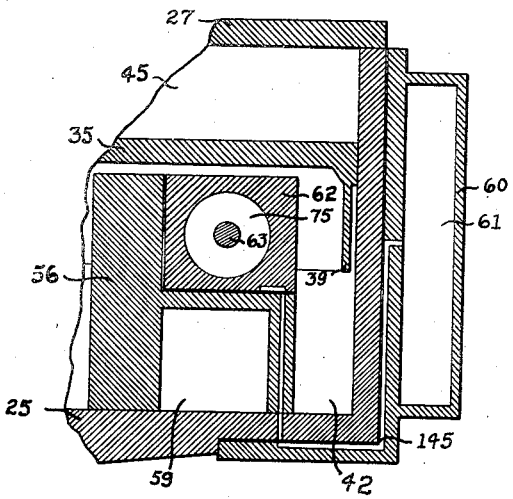
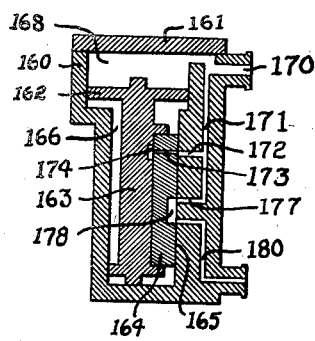
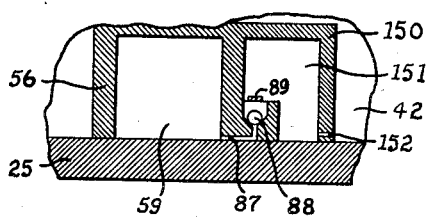
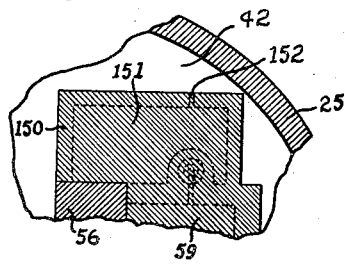
INVENTOR.
BY Julian E Johnson
ATTORNEY.

Dec. 26, 1939.   J. E. JOHNSON   2,185,128
PNEUMATIC SPRING SYSTEM
Filed Sept. 21, 1936   4 Sheets-Sheet 4

INVENTOR.
Julian E. Johnson
BY
ATTORNEY.

Patented Dec. 26, 1939

2,185,128

UNITED STATES PATENT OFFICE 2,185,128

PNEUMATIC SPRING SYSTEM

Julian E. Johnson, Chicago, Ill.

Application September 21, 1936, Serial No. 101,767

21 Claims. (Cl. 267—64)

This invention relates to pneumatic spring systems, and more particularly to automatic air springs which, with auxiliary devices are adapted to provide resilient support for street cars, railroad cars, and motor coaches. Reference may be had to my previous Patent 1,937,896, issued December 5, 1933.

A primary object of this invention is to provide an improved pneumatic spring system.

A further object is to provide improved means for maintaining the pressure in the spring in proper relation to the static load supported on the spring. This includes means for preventing unintended charging or exhaust due to changes in the load on the spring caused by oscillation or braking of the vehicle supported.

Another object is to provide improved fluid damping means.

Still another object is to provide means whereby compressed air for the air springs may be abstracted from air brake systems without affecting the operation of the air brakes.

A further object, in springs having a plurality of supporting pistons, is to provide automatic means for maintaining the proper proportioning of sealing fluid as between the several pressure chambers.

Another object is to provide high pressure charging means so that car springs having but a single supporting piston can support the heavy load upon them, even though the piston area is small enough so that the spring can fit into space available on conventional car trucks.

Still another object is to provide mounting means such that the load will be supported by the springs when they are inflated, and by means other than the springs when the springs are deflated.

These and other objects and advantages are attained with this invention, as will become apparent from the following description, taken in connection with the accompanying drawings, in which—

Fig. 5 is a partial vertical sectional view on line 5—5 of Fig. 4;

Fig. 6 is a partial vertical sectional view on line —6 of Fig. 4;

Fig. 7 is a partial vertical sectional view on line —7 of Fig. 4;

Fig. 8 is a partial vertical sectional view on line —8 of Fig. 4;

Fig. 9 is a partial vertical sectional view on line —9 of Fig. 4;

Fig. 10 is a partial vertical sectional view on line —10 of Fig. 4;

Fig. 11 is a partial vertical sectional view on the same plane as Fig. 5, being on line 5—5 of Fig. 4, and shows alternative damping means;

Fig. 12 is a partial horizontal sectional view on the same plane as Fig. 4, being on line 4—4 of Fig. 1, and, like Fig. 11, shows alternative damping means;

Fig. 15 is a partial horizontal section on line 15—15 of Fig. 13;

Figure 13:
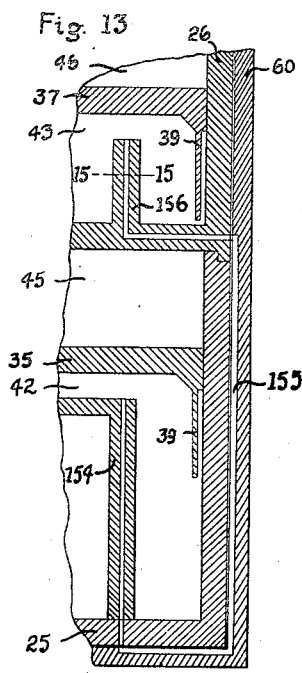
Fig. 13 is a partial vertical section on line 13—13 of Fig. 15.
Figure 14:
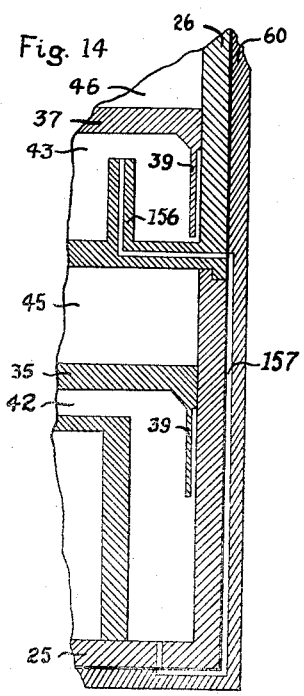
Fig. 14 is a partial vertical section on line 14—14 of Fig. 15.
Figure 18:
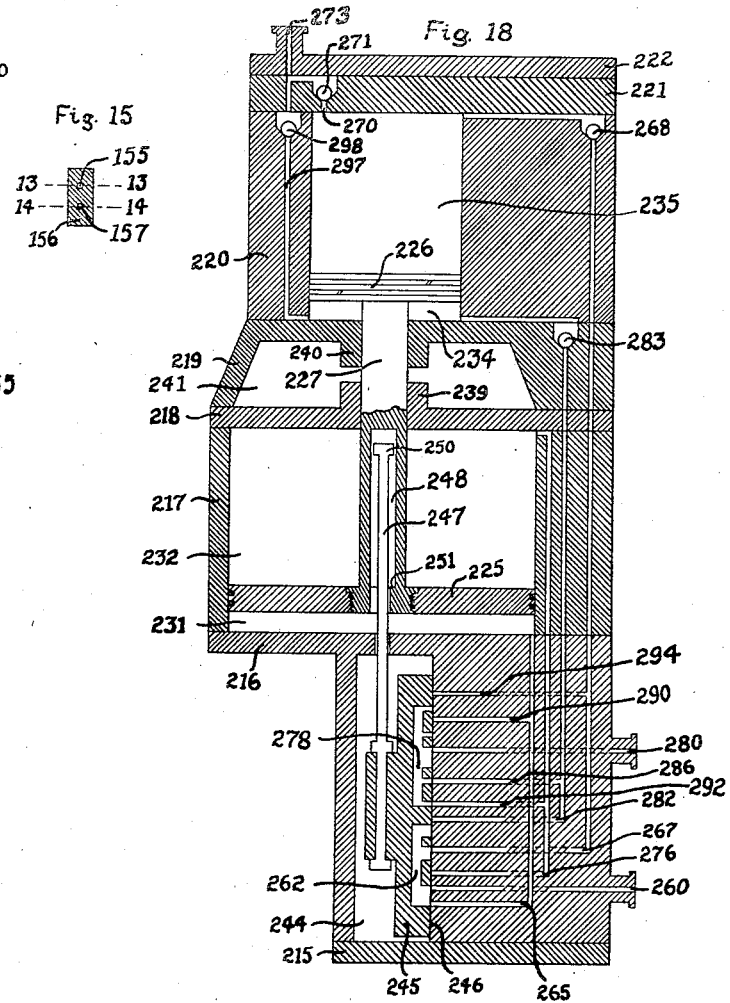
Figure 19:
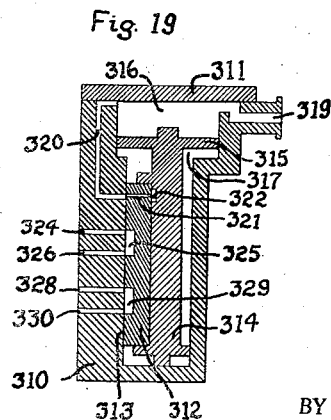

Figs. 13, 14, and 15 show means for maintaining the correct amount of oil in the pressure chambers of a spring having a plurality of supporting pistons;

Fig. 16 shows a vertical central sectional view of means for obtaining compressed air from air brake systems without affecting brake operation;

Fig. 17 is a view, partly in section, on a vertical plane extending crosswise of a car truck, and shows a method of mounting the air springs;

Fig. 18 is a vertical sectional view of a high pressure charging means which enables a spring to support its required load even though it has but one supporting piston with an area limited by the space requirements of conventional car trucks; and Fig. 19 shows a vertical central sectional view of means for preventing unintended charging or exhaust of the springs due to temporary redistribution of load caused by braking of the vehicle on which the springs are mounted.

Figs. 1 to 10 inclusive of the drawings show a spring having one supporting piston. This construction comprises cylinder section 25 and a cover 27 secured thereto.

A piston 35 is positioned within the cylinder, being mounted on stem 33, between shoulder 34 and portion 38 which is threaded onto the top of the stem. Portion 38 is adapted to move up and down through the cover portion, against the surfaces 28.

Piston 35 has a pressure chamber 42 below it, and an atmospheric chamber 45 above it.

Secured to the floor of the pressure chamber is a structure 56, having a valve seat 57, on which slide valve 52 can move vertically. The two projections 58 hold valve 52 to its seat.

Shoulder 51 of stem 33 engages a recess 53 on the back of valve 52, so that vertical movements of piston 35 and stem 33 produce corresponding movements of valve 52.

It will be shown that when valve 52 is in its lower or charging position, compressed air is admitted into pressure chamber 42. When the valve 52 is in its upper or exhaust position, excess air is permitted to escape from chamber 42. When valve 52 is in its middle or lap position, the charging and the exhaust passages are lapped, or blanked.

For the present it will be assumed that valve 70 is in its middle, or open position, as shown in Fig. 5. The operation of this valve is described later.

When the valve 52 is in its lower or charging position, compressed air enters the spring through passage 80, passes through cavity 81 in valve 70, and continues on through 80 to valve seat 57, then through cavities 82, 83, and 84 of valve 52, and through passage 85 into chamber 59, whence the air moves through passage 87 and past ball check valve 88 into pressure chamber 42. Portion 89 is a retaining piece to hold ball valve 88 in its cavity. When the pressure in chamber 42 becomes sufficient to raise piston 35 toward its middle or riding position, passages 80 and 85 are no longer connected by cavities 82, 83, and 84, and charging ceases.

Skirts 39 of piston 35 are set back from the cylinder wall to reduce friction during vertical movement of the piston.

Pressure chamber 42 contains oil or other sealing fluid in such quantity that skirts 39 are immersed during all but exhaust position of the spring. The compressed air in chamber 42 lies above the surface of the oil and immediately below piston 35. It presses downward against the oil, tending to force the oil past the piston and up into chamber 45. So long as the skirts are immersed, no air can escape upward past them.

When valve 52 is in its middle and upper positions, the cavities 110, 111, and 112 connect passages 105 and 114 in valve seat 57, so that chamber 59 is open to the atmosphere through passage 114, cavities 112, 111, and 110, passage 105, cavity 106 in valve 70 and on through 105, cavity 101, and passage 100. Cavity 101, shown in Fig. 7, contains curled hair as an air strainer; portion 102 is a cover for cavity 101.

Since chamber 59 has only atmospheric pressure when the spring is in lap or exhaust, oil which has escaped from chamber 42 past piston 35 into chamber 45 can flow down passage 120 (Fig. 8), past valve 121 and into chamber 59. Portion 122 retains ball valve 121 in its position. When charging next occurs, the compressed air routed through chamber 59 blows the oil ahead of it into chamber 42, whence the oil originally escaped. The charging process, which blows the oil from chamber 59 into chamber 42, might be caused by an increase of load on the spring, or a sufficient escape of oil from chamber 42 could in itself bring about charging.

When the load on this spring is reduced enough to permit piston 35 and valve 52 to rise to their upper positions, cavities 132, 133, and 134 of valve 52 connect passages 130 and 85 in valve seat 57, and exhaust occurs, as shown in Figs. 1, 2, 3, and 4. Air, with perhaps some oil, flows from chamber 42 through port 73 into chamber 72, then through cavity 128 in valve stem 63, through port 129 in valve 70, through passage 130 to valve seat 57, through cavities 132, 133, and 134 in valve 52 and through passage 85 into chamber 59. It has already been shown that chamber 59 is open to the atmosphere through lap and exhaust positions of the spring. Thus any oil which may be mixed with the exhaust air settles to the bottom of chamber 59, to be returned to chamber 42 when charging next occurs; and the air moves out through 114, which is set high above the level of any oil which may be in chamber 59, the air continuing to the atmosphere as previously shown.

Figure 1:
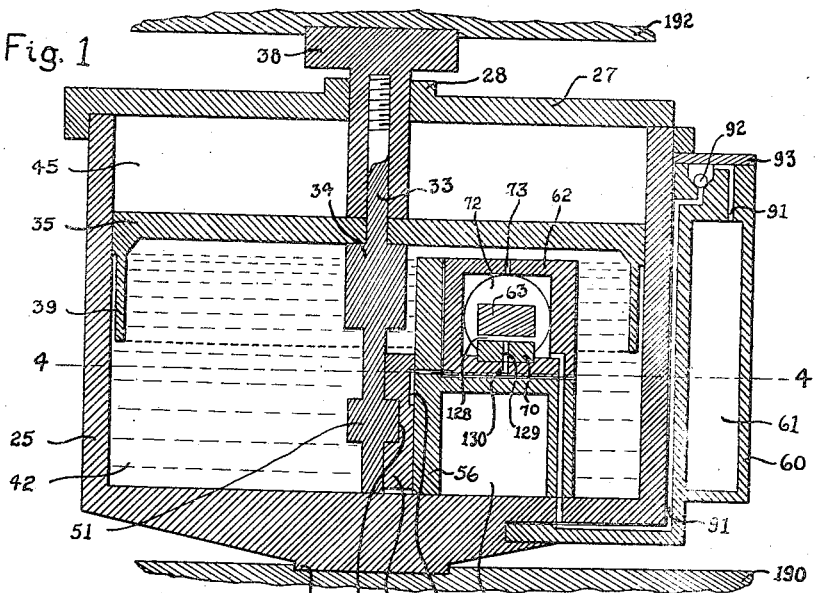
Fig. 1 is a vertical central section on line 1—1 of Fig. 4.

When charging first caused piston 35 to rise from its lower position shown in Fig. 1, there was a decrease in the volume of chamber 45 above the piston, which would tend to increase the pressure of air in 45. This is relieved by atmospheric passage 105, which has a branch to chamber 45, as shown in Fig. 7. Passage 105 enters chamber 45 somewhat below its ceiling; an extreme upward movement of piston 35, as during oscillation, would blank passage 105 and the trapped air in chamber 45 would serve as a cushion to prevent piston 35 from striking cover 27.

To check the duration and the extent of oscillatory movements of the spring, damping means are provided. Fig. 1 shows that air, and perhaps oil, may flow from chamber 42, through port 73, chamber 72, passage 91, past ball check valve 92 (for which 93 is a retaining piece), and on through passage 91 into damping chamber 61. Fig. 9 shows how air, and oil if any, can flow through passage 138, past ball valve 139 and its retaining piece 140, and into chamber 42. When piston 35 is stationary, pressures in chambers 42 and 61 are equal, and there is no flow through their connecting passages. When piston 35 moves downward, as during oscillation, the pressure in 42 becomes greater than in 61, and there is a flow from 42 to 61 through passages 73 and 91. On the piston's reaction upward, there is a flow from 61 to 42 through passage 138.

If chambers 42 and 61 were connected by a single two-way passage, oil might accumulate in chamber 61, lessening the effectiveness of the damping means. For this reason it is preferred to use two one-way passages 91 and 138. If any oil settles to the bottom of chamber 61, it is promptly returned to chamber 42 by passage 138, which is purposely set low in the wall of chamber 61.

The damping effect consists in the flow to-and-fro of fluid through passages 91 and 138.

Thus, when oscillation causes the piston and load to move sharply downward, the pressure in chamber 42 rises considerably; this increase in pressure in 42 stops the downward movement, and then impels the piston and its load back upward. As the pressure in 42 is rising, some of the air in 42 flows to chamber 61; this prevents the pressure in 42 from becoming so high, and reduces the force impelling the piston's reaction upward toward its static position.

When the piston has reacted above its static position, the pressure in chamber 42 is less than its normal amount and less than the pressure in chamber 61. This causes fluid to flow from 61 to 42 in time to oppose gravity's force impelling the load downward again.

It will be noted that when the load is at its lowest point, the high pressure in 42 is relieved somewhat by a flow of air from 42 into 61. And when the load is at its highest point, the low pressure in 42 is increased by a flow of air from 61 to 42 which helps to counteract the unbalanced force of gravity.

An interesting and clarifying comparison is that the friction between the sections of a leaf spring reduces the extent of the load's downward movement during oscillation, and in effect stiffens the spring. Under the same circumstances, pneumatic damping slightly increases the downward movement, even while it slows it, and thus softens rather than stiffens the spring during oscillation.

A second comparison is that the steel spring's resistance to deformation beyond the static load level, and its restoring force, may be described as a primary force, being the force of the spring; whereas the friction between the leaves of the spring sets up a secondary force, opposing the primary force. In the air spring, no secondary force is set up; there is only the dissipation or reduction of the primary force itself, which is the expansive or supporting force of the compressed air in chamber 42.

To check hitting bottom, the following means are available to prevent the piston stem from striking bottom and doing injury during heavy oscillation:

First, the load on the spring should be provided with a "dead rest" so that when the springs are not inflated the load will not rest on the springs.

Second, the volume of chamber 61 should be so small in relation to the volume of chamber 42 that downward movement of the piston would so reduce their combined volumes and increase their common pressure that the piston's downward movement would be halted before going unduly low. This means for halting the downward movement lies in the volume relationship of chambers 61 and 42, and is independent of the size of their connecting passages.

Third, the passages connecting chambers 42 and 61 are of such a restricted size that during the brief moment of the piston's downward movement the pressures in chambers 42 and 61 do not immediately equalize. The flow through these passages is sufficient to have the desired damping effect. If the passages were large enough to secure immediate equalization of pressures in 42 and 61 during oscillation, there would be practically no damping; on the other hand, if the passages were so small that during this brief moment of the piston's downward movement there would be practically no flow between 42 and 61, there would also be practically no damping. The desired damping effect requires a size and length of the passages somewhere between these two extremes. It may be preferable to determine the best passage size experimentally, modifying the passage size at will by a hand operated valve until tests have decided the question.

Fourth, when the piston 25 is at its middle or static level, the oil level in chamber 42 is below the top of port 73, shown in Fig. 1. When the piston moves downward, more oil is displaced by skirts 39 and stem portion 34, and the oil level rises. It may be arranged that heavy downward movement of the piston will cause oil to cover port 73, thus greatly slowing the flow through 73, on the principle that oil will flow more slowly than air through a given port or orifice. This and the preceding paragraph show how air is retained in chamber 42 to prevent the piston from moving unduly low.

Oil entering passage 73 does not harm; it was shown that oscillation will automatically blow such oil to chamber 61 and thence back into chamber 42.

Figure 2:
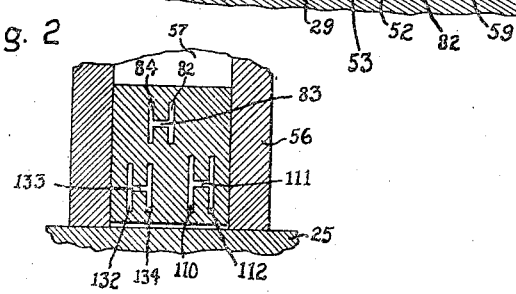
Fig. 2 is a vertical section on line 2—2 of Fig. 4, showing the arrangement of cavities in the slide valve used for charging and exhaust.
Figure 3:
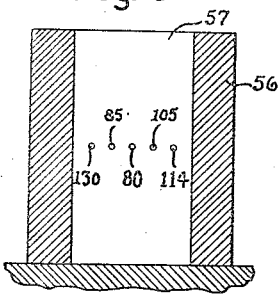
Fig. 3 is a vertical sectional view on line 3—3 of Fig. 4, showing the arrangement of ports in the seat of the foregoing slide valve.

It was shown that valve 52 moves to its charging or exhaust position according to whether piston 35 is in its lower or upper position. Naturally, it is not desirable that oscillatory movements of the piston should move valve 52 alternately from charging to exhaust, as this would waste air. Fig. 2 shows there is a gap between charging cavity 84 and exhaust cavity 134, and this gap may be made of sufficient distance to prevent normal oscillation from causing alternate charging and exhaust of the spring. A more positive method, however, is provided by valve 70 and its associated elements, as shown chiefly in Fig. 5.

Chambers 72 and 75 are on either face of piston 64. Chamber 72 connects with pressure chamber 42 by means of port 73. Chamber 75 connects with damping chamber 61 through passage 145 (Fig. 10). When the pressures on either side of piston 64 are equal, the stem 63 and valve 70 are held in their middle or open position by springs 66 and 67. In this position of valve 70, charging or exhaust occurs according to the position of valve 52. But when oscillation carries piston 35 and valve 52 to their lower level, chamber 42 has higher pressure than chamber 61. This means that, due to passages 73 and 145 just mentioned, chamber 72 has higher pressure than chamber 75, and piston 64 and valve 70 move to the right, blanking cavity 81 so that air cannot flow through charging passage 80 to valve 52.

On the other hand, when oscillation causes piston 35 to rise and move valve 52 to its exhaust position, the communicating chambers 42 and 72 have lower pressure than communicating chambers 61 and 75, and piston 64 moves valve 70 to the left, so that port 129 no longer registers with passage 130, and exhaust air cannot move from chamber 42 to valve 52 through the channels normally used for exhaust.

Likewise, when the spring is charging and chamber 59 contains charging air, it would not be desirable for oscillation to connect chamber 59 periodically with the atmospheric passage 105, as this would waste air. Accordingly, should piston 35 and valve 52 oscillate upward from their charging level, piston 64 moves to the left, and cavity 106 in valve 70 is blanked, thus preventing the compressed air in chamber 59 from flowing to the atmosphere through passage 105.

It will be evident that valve 70 prevents oscillation from having an undesired influence on the spring's automatic features. Charging or exhaust is determined by the static level of piston 35, and not by the levels it may momentarily attain as a result of oscillation.

To save work in drilling passages, portions 60 and 62 are formed with channels which are converted into passages when held air-tight against another surface. Thus portion 60 may be bolted or otherwise suitably attached to cylinder section 25, and portion 62 may be suitably attached to portion 56, with packing layers between as shown. Or if preferred, the portions may be united as by welding.

Figure 4:
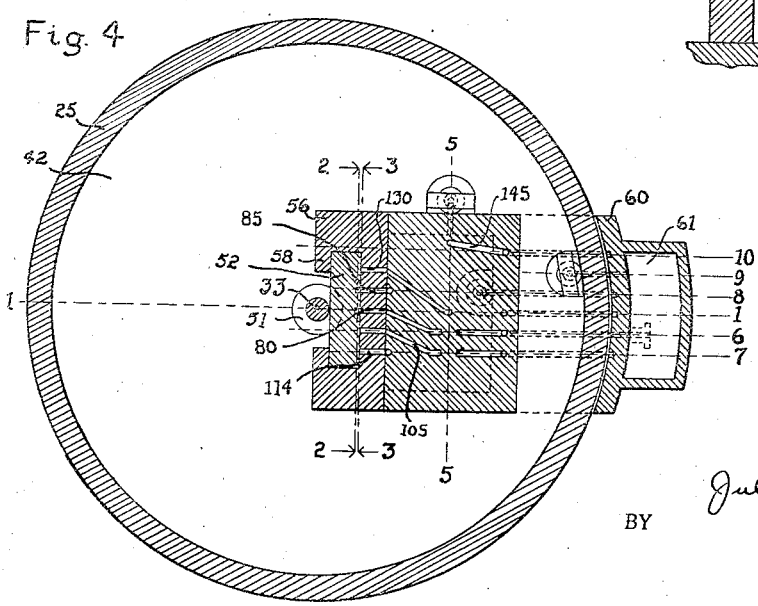
Fig. 4 is a horizontal sectional view on line 4—4 of Fig. 1.

An alternative or supplementary means for fluid damping is shown in Figs. 11 and 12, which are on the same planes respectively as Figs. 5 and 4.

Fig. 11 shows a housing 150 which may be integral with 56. Within 150 is a chamber 151, communicating with chamber 42 through damping passage 152.

In this construction, charging air and oil flow from chamber 59 through passage 87 into chamber 151, and thence through passage 152 into chamber 42.

Routing the charging air through chamber 151 insures that chamber 151 will contain air and not oil above the level of its passage 152.

When the piston 35 is not oscillating, the pressures in chambers 42 and 151 are equal. When piston 35 descends during oscillation, the pressure in 42 becomes higher than in 151, and oil is forced from 42 into 151 through passage 152. On the piston's reaction upward the pressure in 42 becomes less than in 151, and the oil which was forced into 151 on the downstroke is forced back out again.

It will be evident that if chamber 151 contained only oil, there would be little or no movement through passage 152, and hence little or no damping effect. It is the body of air in 151 which compresses and expands, permitting oil to enter on the downstroke, and forcing it out again on the reaction upward.

It was air which flowed between chamber 42 and damping chamber 61, and therefore that system of fluid damping may be termed pneumatic damping. It is oil which flows back and forth between chambers 42 and 151; the air in chambers 42 and 151 is also an essential feature of the system, which therefore may be termed hydropneumatic damping.

Figs. 13, 14, and 15 show means for establishing and maintaining the correct proportion of oil in the pressure chambers of a spring having more than one supporting piston. Oil in pressure chambers 42 and 43 may escape past the piston skirts into atmospheric chambers 45 and 46, whence the oil flows to chamber 59 through a passage correponding to 126 of Fig. 8. The oil is driven from 59 to 42 during charging in the method already described.

If chamber 42 contains oil above the top of portion 154, oil moves through passages 155 and 157 to chamber 43. When the oil level in chamber 42 falls below the top of portion 154, air and not oil moves up through passage 155 until both 42 and 43 are charged and of equal pressure with each other. Thereupon any oil which may be above the top of portion 153 in chamber 43 descends passage 157, air to compensate for the oil coming from 42 to 43 through passage 155. The height of projection 156 establishes the minimum oil level in chamber 43.

It may be noted that chambers 42 and 43 are charged serially, one from the other. This serial charging takes any excess oil from chamber 42 and gives it to chamber 43, thereby establishing the correct oil proportion. Projection 156 maintains this proportioning.

Compressed air for the springs is obtainable in different ways, varying with the type of car involved. On electric railways, the air may be obtained from the main reservoirs on motor cars, and from the supply pipe on trailers. The modern steam railroad car has an electric circuit used for lighting purposes which may also operate a small air compressor for the springs; or instead, air may be taken from the brake pipe without affecting brake operation, through the use of the special valve means shown in Fig. 16.

In this valve means, housing 160 contains a piston 162 whose stem 163 operates slide valve 164 on its seat 165. The piston has a chamber 166 below it, containing the slide valve, and a chamber 168 above it. Air from the brake pipe enters chamber 168 through passage 170; brake pipe air also flows down branch 171, through passage 172 to seat 165, through restricted port 173 in the slide valve, and through stem cavity 174 into chamber 166.

In the valve's open position as shown, brake pipe air also flows through passages 170, 171, and 177 to valve seat 165, through cavity 178 in valve 164, and through passage 180 out of housing 160, and toward the air springs.

A reduction in brake pipe pressure affects chamber 168 sooner than chamber 166, because valve passage 173 is much smaller than passage 170 to chamber 168. When 168 has less pressure than 166, piston 162 rises, causing valve 164 to blank passages 172 and 177. This prevents withdrawals of air from the brake pipe for air spring use until valve 164 returns to its open position.

An essential feature of valve 164 is that it is more sensitive than the slide valve in the triple valve (or corresponding valve). Thus if a reduction of 4 lbs. per sq. in. in the brake pipe is needed to move the triple valve from its release position, a smaller reduction of brake pipe pressure, say 2 lbs. per sq. in., should lift valve 164 to its closed position.

The brake pipe does not regain its fully charged condition until after the release and recharge of the brakes is completed. When piston 162 rose, it increased the volume of chamber 166, thereby slightly reducing its pressure; this means that when the brake pipe is fully recharged, there is a slightly higher pressure above piston 162 than below it; this difference of air pressure, plus the effect of gravity, affords positive means for returning valve 164 to its lower or open position.

When the brake pipe pressure is reduced, either through the brake valve or due to slight withdrawals of air for the springs, valve 164 closes before the triple valve leaves its release position. This insures that withdrawals of air from the brake pipe for spring purposes can neither cause an unintended application of the brakes, nor can they slow the normal release following an application of the brakes by the engineman.

It is believed that the air in a well designed air spring should require replenishing only a few times a month, hence the withdrawals from the brake pipe for spring use should be negligible.

Fig. 17 shows air spring mounting means, including a truck bolster revised to provide suitable vertical space for the spring. In this system of mounting, the air springs take the position of the elliptic springs.

Rib 29 across the base of the air spring is recessed into the top of spring plank 190, while the T-shaped load rest 38 is recessed into the under side of the truck bolster 192, the T-head being crosswise of the bolster. When the spring is deflated, surface 193 of the bolster rests on surface 194 of the sideframe 195.

Lateral motion is limited when depending portion 197 of the bolster comes into contact with surface 199 of the sideframe. Plates 200 may be attached to the side of the truck bolster to strengthen it.

Other details in Fig. 17 may be identified as follows: 202, equalizers; 204, truck center plate; 205, car body; and 207, side bearings.

Due to the turning and other motion of the car trucks with respect to the car body, air pipes attached to the car body may be connected by means of swivel joints with pipes attached to the spring planks and leading to the air springs. Or flexible hose, smaller but similar in construction to air brake hose, may join the springs to the air pipes on the car body and allow for truck movements.

Fig. 18 shows means for increasing the unit pressure under the air spring piston, so that its necessarily great supporting force can be attained without resorting either to plurality of supporting pistons, or to a single piston of too great diameter to fit between the transoms of the usual car truck.

The device in Fig. 18 is operated by air obtained from the brake pipe. Its purpose is to receive brake pipe air, increase its pressure perhaps fourfold, and deliver this high pressure air to a special air spring reservoir. The device is a form of booster pump, with novel features made necessary because usual booster pumps apparently would not operate in this special field, as will be explained later. Any other supply of compressed air of relatively low pressure may be used instead of the brake pipe, hence the term "brake pipe" may be understood to mean "brake pipe or other source of compressed air of relatively low pressure".

In Fig. 18, the housing means comprises sections 215, 216, 217, 218, 219, 220, 221, and 222, which are suitably attached together in airtight relation, and may have stepped connection to resist side slipping.

Large piston 225 and small piston 226 are suitably mounted on stem 227. Piston 225 has chamber 231 below it and chamber 232 above it. Piston 226 has chamber 234 below it and chamber 235 above it.

Portions 239 and 240 may be replaced by any conventional packing means which may be suitable; chamber 241 and housing sections 218 and 219 are to render more convenient the arrangement of stem packing.

Slide valve chamber 244 contains slide valve 245, which is slidable on seat 246, such motion being regulated by valve operating rod 247. Rod 247 extends up into chamber 248. When piston stem 227 moves far enough down, the ceiling of stem chamber 248 contacts the top of head 250, forcing rod 247 and valve 245 downward to the position shown in Fig. 18.

When piston stem 227 moves high enough, step 251 in chamber 248 engages the lower edge of head 250, raising rod 247 and its attached valve 245.

Valve 245 has three positions, lower, middle, and upper. In the lower position illustrated, air from the brake pipe enters through passage 260, and continues through valve cavity 262 and passage 265 to lower chamber 231. Also in the lower position of the valve, upper chamber 235 may receive compressed air from the brake pipe through passage 260, valve cavity 262, and through passage 267 past check valve 268 when check valve 268 can be lifted, which is only on the downstroke of the pistons; on the pistons' upstroke, compressed air in chamber 235 is further compressed and forced through passage 270, past check valve 271, and through passage 273 into the air spring storage reservoir. In the lower position of valve 245, chamber 232 exhausts to the atmosphere through passage 276, and its branch passage 292, valve cavity 278, and passage 280, while chamber 234 draws atmospheric air through passage 280, valve cavity 278, and passages 286 and 282, past check valve 283. Air exhausted from chamber 232 may of course pass to chamber 234 without actually reaching the external atmosphere.

As piston 225 moves upward to its top level, and its motion is about to be reversed, it is evident that the flow of compressed air through passage 265 into chamber 231 must be stopped, and chamber 231 must be allowed to exhaust. The charging passage must cease to register before the exhaust passage begins to register, otherwise compressed air might flow through chamber 231 to the atmosphere. After the charging of chamber 231 ceases, but before its exhaust begins, there is a blank space, or dead spot; the usual booster pump uses a governor and operates rapidly whenever the governor is cut in, so that its momentum or speed of operation carries it past this dead spot. The form of booster pump shown in Fig. 18 uses no governor. To protect the operation of the air brakes, it secures its air from the air brakes through the valve means shown in Fig. 16, closure of which valve would slow or stop the operation of the booster pump; hence a governor would be incapable of assuring rapid motion to carry the pump past the dead spot described. This is why the usual booster pump would stall and become inoperative at certain positions, if used in the class of service here described.

The novel means which prevents stalling in the booster pump of Fig. 18, comes into operation when valve 245 moves up to its middle position. In this intermediate position, chambers 231 and 232 are blanked, having no connection either with charging or exhaust passages. Passage 267 still has compressed air in it, which cannot raise check valve 268 because the pressure in chamber 235 is higher. Chamber 234 had only atmospheric pressure when valve 245 was in its lower position, but now in the intermediate position of valve 245, chamber 234 is charged with compressed air through passage 260, cavity 262, and passage 282, past check valve 283. The compressed air thus admitted to chamber 234 forces the pistons, valve operating rod, and slide valve 245 upward past the dead spot previously described.

In the upper position of valve 245, chamber 231 exhausts through passages 265 and 290, cavity 278, and passage 280 to the atmosphere. Chamber 232 charges through passage 260, cavity 262, and passage 276. This tends to force piston 225 downward, carrying with it stem 227 and small piston 226. The tendency to vacuum in chamber 235, as the pistons descend, is relieved by influx of atmospheric air through passage 280, cavity 278, and passages 294 and 267, past check valve 268. The downward movement of piston 226 reduces the volume of chamber 234, so that the brake pipe pressure therein is further compressed; check valve 283 prevents this high pressure air from returning to the brake pipe through passage 282, while passages 297 and 273 allow it to flow to the air spring storage reservoir, from which backflow is prevented by check valves 298 and 271.

When pistons 225 and 226 and their stem 227 near their lowest position, the roof of stem chamber 248 depresses head 250 of valve operating rod 247, forcing valve 245 to its intermediate position. As already explained in tracing the pistons' upward movement, chambers 231 and 232 on either face of piston 225 are now blanked, creating the dead spot already referred to. But during the downward movement of the pistons, while valve 245 was yet in its upper position, chamber 235 had only atmospheric pressure; the movement of valve 245 downward to its middle position charges chamber 235 with compressed air from the brake pipe through passage 260, cavity 262 and passage 267 past check valve 268, thus providing the necessary force to move the pistons downward through what otherwise would be a dead spot. This continuance of the pistons' downward movement causes valve 245 to be returned to its lower position, thereby reversing the motion and starting anew the cycle just described.

Piston 225 has twice the diameter of piston 226, and four times its area, neglecting the area of the stem 227. Thus, if the brake pipe pressure is 70 lbs. per sq. in., the booster pump would continue to operate, unless stopped temporarily by closure of the valve shown in Fig. 16, until the pressure in the air spring storage reservoir is approximately four times 70 lbs. per sq. in., or 280 lbs. per sq. in. When this occurs, the booster pump will simply stop, and will renew operation only after the pressure in the air spring storage reservoir has been reduced. The speed of operation of the booster pump will be slowest when the pressures above and below its pistons are nearly equal, as when the air spring storage reservoir is nearly charged to its maximum amount; when the storage reservoir is just beginning to charge, the booster pump will operate more rapidly, its speed being limited by the size of its air passages.

A well designed air spring should require only a minor re-charging a few times a month, which means that the booster pump should operate slowly for but a few strokes during that period of time.

The feature of this booster pump which distinguishes it from other booster pumps is that it can operate slowly or stop at any point, and yet will not stall or become inoperative, but will resume operation when the pressure in the air spring storage reservoir is sufficiently reduced.

When air is to be compressed to a high unit pressure, it is well known that compression by stages is preferred. In single-stage compression excessive heat develops, temporarily expanding the air and causing the compressor to waste energy bringing about a high pressure which later will be reduced as cooling causes the air to contract. The use of relatively low pressure air from a brake pipe or other source, in conjunction with the booster pump shown in Fig. 18, affords a means of two-stage compression which has important advantages in providing the necessary supply of compressed fluid for a high pressure pneumatic spring.

Obviously a high pressure spring adapted to support a given load need not be of such large diameter as a low pressure spring adapted to support the same load. When the sprung load may exceed 160,000 lbs., this economy of size may mark the difference between practicality and impracticality. The spring of smaller diameter is more easily mounted in space available for it. It weighs less, and weight is important in transportation. It requires less material to construct, and therefore is cheaper. Thus the high pressure charging means coacts to produce advantages not inherent in a relatively low pressure pneumatic spring.

When its brakes are applied, the forward end of a car becomes heavier while its rear end becomes lighter. It is not desirable that such temporary redistribution of weight should cause charging and exhaust of the air springs. The gap between the charging and exhaust ports and cavities, shown in Fig. 2, may be sufficient to prevent such unintended charging and exhaust. In case the gap mentioned is not sufficient for this purpose, the valve means shown in Fig. 19 is designed to prevent waste of air from this cause.

In Fig. 19, valve housing 310 and its cover 311 inclose valve 312, which is slidable on seat 313 and controlled by stem 314 and its piston 315. Piston 315 has chamber 316 above it and chamber 317 below it. Large passage 319 brings compressed air from the brake pipe to chamber 316; part of such air continues through passage 320, restricted passage 321 and stem cavity 322 into chamber 317. Charging the brake pipe increases the pressure in chamber 316 faster than in chamber 317, forcing piston 315 down as shown. Reducing brake pipe pressure, as during a brake application, decreases the pressure in chamber 316 faster than in chamber 317, raising piston 315 and valve 312 and blanking the passages in the valve seat. Since brake pipe pressure normally reduces or increases rather slowly, the flow of air through passage 320 may be slowed in proportion by making port 321 sufficiently small, or by increasing the volume of chamber 317; or air through passage 320 may be forced to flow through a cavity containing a double screen interlaid with curled hair as in an air strainer. Similar steps may be taken if desired with the valve shown in Fig. 16.

A supply of compressed air for the spring may be routed through passage 324, cavity 325, and passage 326 when valve 312 is open, and thence through charging passage 80 into the spring. Reducing brake pipe pressure to apply the brakes causes valve 312 to close; the forward end of the car presses more heavily on the air springs, possibly moving them into their charging position, but actual charging does not occur because the supply of compressed air is blanked by valve 312.

When brakes are applied, the rear end of the car becomes lighter, perhaps moving the air springs at that end of the car to their exhaust position. Loss of air due to such movement of the springs to exhaust position may be prevented by the following means: Instead of allowing passage 130 to flow directly to the valve seat 57, as shown in Figs. 1 and 4, passage 130 would be re-routed instead through passage 328, cavity 329, and passage 330 when valve 312 is open, and thence to valve seat 57. Closure of valve 312 during brake applications thus prevents air from the communicating chambers 42 and 72 from being exhausted through 132, 133, and 134 of valve 52 (see Fig. 2). Additional channel means may be provided in portion 60 to bring passage 130 to and from valve 312.

The valve means shown in Fig. 19 preferably would be attached to channel portion 60 of each spring, the chamber 61 being redesigned to so permit; chamber 61 may be formed as an inverted U over the valve means.

In automatic air brakes, straight air brakes, electrically controlled air brakes, or electrically operated brakes, the means for controlling the application of the brakes may be adapted to close valve 312, while the means for releasing the brakes may be adapted to reopen valve 312. Thus, in general terms it may be said that valve 312 is operable by the brake control means.

The term "source of compressed air" may mean the main reservoir or control pipe on electric cars, or an air compressor specially provided, or the brake pipe where other sources of compressed air are not convenient, or it may include any other means for supplying compressed air. The valve means of Fig. 16 is used only if the brake pipe is the source of compressed air.

The compressed air may next flow through the booster pump shown in Fig. 18, to increase the unit pressure. From the pump it may flow into a storage reservoir. Next, provided brakes are not applied, it would flow through the valve means shown in Fig. 19, which is attached to the individual air spring. Finally, when the spring is in charging position, the compressed air would flow through valve 52 into pressure chamber 42. Operating tests may show that it is possible to dispense with the use of the valve means of Fig. 19, and also the storage reservoir suggested as following the booster pump.

This invention relates to a spring means, regardless of what compressible fluid is used therein; hence the general term "pneumatic spring," or the specific term "air spring," may be used interchangeably.

The expressions "loaded spring" or "loaded piston" mean that the spring or piston is supporting a load, as for example a portion of a car body. The term "static load" means that the load is at rest or not undergoing vertical oscillation.

I claim:

1. Pneumatic spring means adapted to give resilient support to a load and including cylinder means, piston means slidable therein, pressure chamber means adjacent said piston means, and auxiliary chamber means communicating with said pressure chamber means through restricted passage means so that the two said chamber means will have equal pressures when said load is static and unequal pressures when oscillation of said load causes said piston means to alter the volume of said pressure chamber means, passage means through which compressed fluid may be admitted to or exhausted from said pressure chamber means, valve means operable by variations in the level of said piston means when statically loaded, said valve means controlling said passage means so that the compressed fluid in said pressure chamber means will be adapted to support the static load on said piston means at the level best suited to spring action, and additional valve means controlling said passage means and being normally open when the pressures in the two said communicating chamber means are equal, and adapted to close and prevent flow of fluid through said passage means when the pressures in the two said communicating chamber means are unequal.

2. A pneumatic supporting spring comprising cylinder means, piston means slidable therein and adapted to support a load, pressure chamber means below said piston means and containing air of sufficient pressure and amount to support the loaded piston approximately at its middle or riding level, valve-and-passage means for admitting air to or exhausting it from the pressure chamber means so that the loaded piston means will continue to float approximately at its middle level regardless of changes in the static load, auxiliary chamber means communicating with the pressure chamber means through a restricted passage so that when the load is static the pressures in the two chamber means are equal, additional valve means normally held at a middle position by metallic springs, the charging and exhaust passages routed through the said additional valve means when it is in its middle or open position, a piston connected to said valve means and having pressure chamber air on its one face and auxiliary chamber air on its other face, so that during oscillations of the load the two chamber means will have pressures different from each other, thereby moving the said additional valve means to either side of its middle position and blanking the exhaust and the charging passages.

3. An air spring adapted to support a load and having a liquid-sealed pressure chamber and automatic means for controlling the pressure and amount of compressed air in the spring in harmony with the static load thereon, and hydropneumatic damping means associated therewith and comprising a damping chamber, a damping port or passage whose one end enters the damping chamber at a low level and whose other end enters the pressure chamber at a level below the surface of the sealing liquid therein, and passage means whereby compressed air admitted to the spring will be routed through the damping chamber to the pressure chamber, thereby insuring that the damping chamber will contain a resilient body of air above the level of the damping passage, so that oscillation of the spring will cause a difference of air pressures as between the two chambers such as would force the sealing liquid to flow back and forth through the damping passage, thereby damping the spring's oscillation.

4. An air spring adapted to support a load and including cylinder means with piston means slidable therein, pressure chamber means adjacent to said piston means and so disposed that when the spring is deflated the pressure chamber means will be filled with solid or liquid substance to the exclusion of air, so that when the spring is inflated and supporting an oscillating load the compressed air in the pressure chamber means will prevent the piston means from striking bottom by more than a safe margin, and fluid damping means associated therewith and including a damping chamber having a damping passage communicating with said pressure chamber means, the volume of the damping chamber being restricted in comparison with the volume of the inflated pressure chamber means so that downward movements of the piston means during oscillation will decrease the volume of the two said chambers and increase their pressure sufficiently to halt the downward movement of the piston means before it can strike bottom.

5. An air spring adapted to support a load and including cylinder means with piston means slidable therein, pressure chamber means adjacent to said piston means, the pressure chamber means being so designed or arranged that when the spring is inflated and supporting an oscillating load the compressed air in the pressure chamber means prevents the piston means from striking bottom by more than a safe margin, and fluid damping means associated therewith and including a damping chamber connected by damping passage means with said pressure chamber means, the flow of fluid between the two said chambers during oscillation being so restricted by the damping passage means as to accomplish damping without permitting the piston means to strike bottom.

6. A pneumatic spring having a liquid-sealed pressure chamber, pneumatic damping means comprising a damping chamber and damping passage means connecting said damping chamber with said pressure chamber, and means associated with said passage means and adapted to prevent accumulations of sealing liquid in said damping chamber.

7. Pneumatic spring means adapted to give resilient support to a load and including cylinder means, piston means slidable therein, and liquid-sealed pressure chamber means adjacent said piston means, pneumatic damping means comprising damping chamber means and damping passage means affording communication between said damping chamber means and said pressure chamber means, and means associated with said damping means and actuated by movements of said piston means resulting from oscillations of said load wherewith to prevent accumulations of sealing liquid in said damping chamber means.

8. A load-supporting pneumatic spring having pressure chamber means containing compressed fluid as a resilient means and liquid as a sealing means, said pressure chamber means being adapted to decrease its volume and increase its supporting pressure during downward oscillatory movement of said load, and to increase its volume and decrease its pressure during upward oscillatory movement of said load; damping means including damping chamber means communicating with said pressure chamber means through damping passage means, said damping passage means including a one-way restricted passage extending from above the normal level of liquid in said pressure chamber means to said damping chamber means, and a one-way restricted passage leading from a low level in said damping chamber means to said pressure chamber means, so that when said load is static said communicating chambers have equal pressures; and when downward oscillation of said load causes increase of pressure in said pressure chamber means, a quantity of compressed fluid and possibly some sealing liquid move from said pressure chamber means through said first-named passage to said damping chamber means, where any such sealing liquid settles to the bottom; and when upward oscillation of said load causes decrease of pressure in said pressure chamber, any sealing liquid which may have gathered on the floor of said damping chamber means is thereby caused to move through said second-named passage back to said pressure chamber means, thus insuring that the effectiveness of said damping means will not be reduced due to accumulations of sealing liquid in said damping chamber means.

9. Pneumatic spring means adapted to give resilient support to a load and including cylinder means and piston means slidable therein, liquid-sealed pressure chamber means adjacent said piston means, pneumatic damping means comprising damping chamber means communicating with said pressure chamber means through damping passage means, said damping passage means including a one-way restricted passage extending from above the normal level of sealing liquid in said pressure chamber means to said damping chamber means, and a one-way restricted passage extending from a low level in said damping chamber means to said pressure chamber means, so that when the piston means is static the pressures in the two said communicating chamber means will be equal, and when the piston means undergoes a compressive movement during oscillation of the load a quantity of compressed fluid mixed perhaps with sealing liquid will flow from said pressure chamber means through said first-named passage to said damping chamber means, where any sealing liquid will settle to the bottom, and when the piston means reacts away from its compressive position compressed fluid will move from said damping chamber means to said pressure chamber means through said second-named passage, propelling any sealing liquid before it, thereby insuring that the effectiveness of said damping means will not be diminished by accumulations of sealing liquid in said damping chamber means.

10. An air spring including cylinder means with piston means slidable therein, an oil-sealed pressure chamber on the under face of said piston means, damping means including a damping chamber communicating with said pressure chamber through damping passage means, said damping passage means including a one-way restricted passage extending from above the normal level of sealing oil in said pressure chamber to said damping chamber, and a one-way restricted passage extending from a low level in said damping chamber to said pressure chamber, so that when downward oscillatory movement of said piston means decreases the volume and increases the pressure in said pressure chamber, a quantity of compressed air intermixed possibly with sealing oil moves from said pressure chamber through said first-named passage into said damping chamber, where such sealing oil if any be transmitted settles to the bottom of said damping chamber; and when said piston means reacts upward, increasing the volume and decreasing the pressure in said pressure chamber below the pressure in said damping chamber, any oil in said damping chamber is thereby propelled through said second-named passage back to said pressure chamber, thereby insuring that the effectiveness of said damping means will not be lessened by accumulations of sealing oil in said damping chamber.

11. Pneumatic spring means including cylinder means and piston means slidable therein, pressure chamber means adjacent said piston means and having liquid therein as a pressure sealing means, pneumatic damping means comprising damping chamber means and damping passage means affording communication between said damping chamber means and said pressure chamber means, said damping passage means including a one-way restricted passage leading from above the normal level of liquid in said pressure chamber means to said damping chamber means, and a one-way restricted passage leading from a low level in said damping chamber means to said pressure chamber means, said passage means being adapted to provide equality of pressures as between said pressure chamber means and said damping chamber means when said piston means is stationary in said cylinder means, whereas compressive movement of said piston means is adapted to increase the pressure in said pressure chamber means above the pressure in said damping chamber means and thereby propel a quantity of compressed fluid mixed perhaps with some sealing liquid from said pressure chamber means through said first-named passage to said damping chamber means; recoil of said piston means from its compressive position being adapted to decrease the pressure in said pressure chamber means below the pressure in said damping chamber means, thereby causing a flow of compressed fluid from said damping chamber means to said pressure chamber means through said second-named passage, the back-and-forth movements of compressed fluid through said restricted passages serving to damp oscillations of said piston means, while the movement of compressed fluid from said damping chamber means to said pressure chamber means, being through said one-way passage leading from a low level in said damping chamber means, propels any sealing liquid which may have settled to the bottom of said damping chamber means back into said pressure chamber means, thereby insuring that sealing liquid will not accumulate in said damping chamber means so as to reduce the effectiveness of said damping means.

12. A pneumatic supporting spring comprising cylinder means, piston means slidable therein and adapted to support a load, pressure chamber means below said piston means, liquid in said pressure chamber means as a pressure sealing means, valve-and-passage means for admitting compressed fluid to or exhausting it from said pressure chamber means so that the loaded piston means will be floated at approximately its middle level regardless of changes in its static load, auxiliary chamber means with one-way passage means leading from the pressure chamber means to the auxiliary chamber means and a second one-way passage means leading from a low level in said auxiliary chamber means to said pressure chamber means, additional valve means adapted to prevent unintended charging or exhaust during oscillation and being in effect a correction valve for the charging-and-exhaust valve, said correction valve means being normally held at a middle position by metallic springs, the charging and exhaust passages being routed through the said correction valve means when it is in its middle or open position, a piston connected to the correction valve means and having a chamber on its one face having passage communication with the pressure chamber means and a chamber on its other face communicating with the auxiliary chamber means, so that during oscillation of the load the two said chamber means will have pressures different from each other, thereby moving the said additional valve means to either side of its middle position and blanking the exhaust and the charging passages, the passage connecting the pressure chamber means to the correction valve chamber being part of the one-way passage means from the pressure chamber means to the auxiliary chamber means, so that any sealing liquid entering the correction valve chamber will not be allowed to accumulate there but will be propelled during oscillation to the auxiliary chamber means and thence back to the pressure chamber means.

13. An air spring having a plurality of pistons adapted to support a load, chamber means below each of said pistons and adapted to receive and contain compressed air and being pressure chamber means, oil in said pressure chamber means as a sealing means, automatic charging means whereby compressed air may be admitted to the lower chamber of said pressure chamber means when the statically loaded pistons fall below their normal riding levels, means whereby escaped oil is returned to the lower chamber of said pressure chamber means, passage means extending from the normal oil level in each pressure chamber to the normal oil level in the pressure chamber immediately above, so that during charging excess oil and air may flow from the lower pressure chamber to the upper pressure chambers in sequence, the height of said passage openings serving to establish and maintain a minimum oil level in each pressure chamber, and a second set of passages extending from the minimum oil level in each pressure chamber to the pressure chamber immediately below so that if an excess of oil occurs in any of the upper pressure chambers said excess of oil may flow down one set of passages and air to compensate for it may flow upward through the other set of passages.

14. An air spring having a plurality of pistons adapted to support a load, pressure chamber means below each of said piston means, oil in each of said pressure chamber means as a sealing means, and passage means opening into each of said pressure chamber means at its normal oil level, so that if oil accumulates in any chamber means above the level of its passage opening, that chamber means will have less air volume than another chamber means whose oil level is below its passage opening, and downward oscillation of the pistons will cause chambers having an excess of oil to develop a higher air pressure than chambers deficient in oil, such predominance of air pressure serving to propel oil from chambers having an excess of oil to chambers having a deficiency of oil, the height of said passage openings establishing the minimum oil level in each chamber and preventing backflow of oil which may lie below the level of said passage openings.

15. A pneumatic spring having cylinder means, piston means slidable therein and adapted to support a load, pressure chamber means under said piston means and containing a lower layer of sealing liquid and an upper layer of compressed fluid adapted to give resilient support to the loaded piston means, and depending skirt means integral with or attached to the piston means and extending into the sealing liquid so that any escape upward past the piston means will be of sealing liquid and not compressed fluid, said skirted piston means having its upper or head portion in slidable contact with the cylinder means while its lower or skirt portion, being of less diameter than said upper portion, avoids such contact and thereby lessens friction.

16. An automatically chargeable air spring adapted to contain compressed air of such high unit pressure that compression by stages is desirable to avoid excessively heating the air as an incident to its compression, means providing a supply of compressed air of relatively low pressure, means operable by said low pressure air and adapted to further compress said low pressure air to the high pressure required by the spring to support its load, passage means connecting said supply means to said high compression means, and additional passage means connecting said high compression means to said spring.

17. An automatically chargeable air spring, means supplying compressed air of such relatively low pressure as is conveniently obtainable by single-stage compression, and means for further compressing said low pressure air up to a predetermined maximum pressure, said last named means being adapted to stop automatically without the use of a pressure governor when said maximum pressure has been attained, and to resume operation without danger of stalling when said pressure falls below said maximum.

18. An automatically chargeable high pressure air spring, means associated therewith and adapted to provide a supply of compressed air of relatively low unit pressure, said pressure being normally maintained at an approximately definite amount, high pressure charging means operable by said low pressure air and adapted to compress said low pressure air to the higher pressure required for said spring, passage or conduit means leading from the low pressure supply means to the high pressure charging means and being a low pressure passage means, and additional passage means comprising a passage or conduit to which a reservoir may be attached and leading from the high pressure charging means to said spring so as to form a high pressure passage means, said high pressure charging means having piston means of different areas, the area of the smaller piston means bearing approximately the same ratio to the area of the larger piston means as said lower unit pressure of air bears to the maximum unit pressure of air compressible by said high pressure charging means, said high pressure charging means being adapted to suspend its operation when said high pressure passage means attains its maximum unit pressure, and to resume its operation when the pressure in said high pressure passage means falls below its maximum amount, without danger of stalling or becoming inoperative regardless of the position at which said high pressure charging means may suspend its operation.

19. A high pressure automatically chargeable air spring, a supply of compressed air of relatively low unit pressure, said pressure being normally maintained at a definite amount, high pressure charging means adapted to raise said low pressure air to the higher pressure required for the spring, passage or conduit means leading from the low pressure supply means to the high pressure charging means, valve means governing said passage means and adapted to close when said supply means falls below its normal pressure and to reopen when said normal pressure is regained.

20. Pneumatic spring means comprising a plurality of pneumatic springs adapted to give resilient support to a vehicle, means connected to each of said springs by suitable passage or conduit means and adapted to provide compressed fluid for said springs, valve means associated with each of said springs and adapted to admit compressed fluid from said passage means into said springs so that the supporting pressure of each spring will be in proportion to its static load, and additional valve means associated with said valve and passage means and adapted to prevent admission of compressed fluid to said springs in response to temporary redistribution of load on the springs due to deceleration of said vehicle.

21. Pneumatic spring means comprising a plurality of pneumatic springs adapted to give resilient support to a vehicle, means for supplying compressed fluid for said springs and being connected to each of said springs by suitable passage or conduit means, valve means associated with each of said springs and adapted to admit compressed fluid from said passage means to said springs or to exhaust compressed fluid from said springs to the atmosphere so that the supporting pressure of each of said springs will be in proportion to its static load, and additional valve means associated with each of said springs and adapted to prevent charging or exhaust of said springs in response to temporary redistribution of load on said springs due to deceleration of said vehicle.

JULIAN E. JOHNSON.